United States Patent [19]
Yoshigai

[11] Patent Number: 4,838,387
[45] Date of Patent: Jun. 13, 1989

[54] CENTER-PULL CALIPER BRAKE

[75] Inventor: Kenichi Yoshigai, Osaka, Japan

[73] Assignee: Yoshigai Kikai Kinzoku Co., Ltd., Higashi-Osaka, Japan

[21] Appl. No.: 197,162

[22] Filed: May 23, 1988

[30] Foreign Application Priority Data

May 29, 1987 [JP] Japan .............................. 62-85358[U]

[51] Int. Cl.$^4$ .............................................. B62L 3/02
[52] U.S. Cl. .............................. 188/24.21; 188/24.12; 188/24.22; 267/155; 267/277
[58] Field of Search ............... 188/24.12, 24.21, 24.22, 188/22.3, 72.9; 267/275, 277, 278, 15.5

[56]  References Cited
U.S. PATENT DOCUMENTS

| | | | |
|---|---|---|---|
| 4,511,018 | 4/1985 | Scott | 188/24.12 |
| 4,597,474 | 7/1986 | Nagano | 188/24.21 |
| 4,768,623 | 9/1988 | Nagano | 188/24.21 |

FOREIGN PATENT DOCUMENTS

| | | | |
|---|---|---|---|
| 845015 | 7/1952 | Fed. Rep. of Germany | 188/24.12 |
| 3722712 | 7/1988 | Fed. Rep. of Germany | 188/24.21 |
| 1143998 | 10/1957 | France | 188/24.22 |

Primary Examiner—George E. A. Halvosa
Attorney, Agent, or Firm—Sixbey, Friedman, Leedom & Ferguson

[57]  ABSTRACT

Each of a pair of brakes arms has a boss portion formed with a cavity around a pivot on an arm bracket for supporting the brake arms on the body of a bicycle. A pair of return springs for biasing the brake arms toward or away from each other for braking each have a coil portion provided around the pivot and accommodated in the cavity. The return spring has one end fixedly engaged in the boss portion and the other end fixedly engaged in a spring adjusting member which is supported by the pivot and rotatable only in the coil portion winding direction. Thus, each return spring is protected from corrosion, made smoothly operable for the desired braking action and readily adjustable by turning the adjusting member.

3 Claims, 3 Drawing Sheets

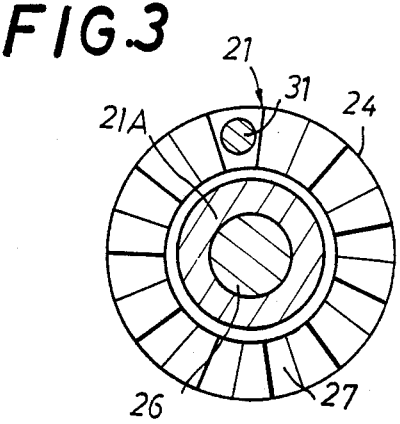
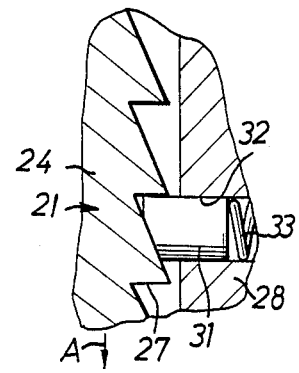
FIG.3
FIG.4
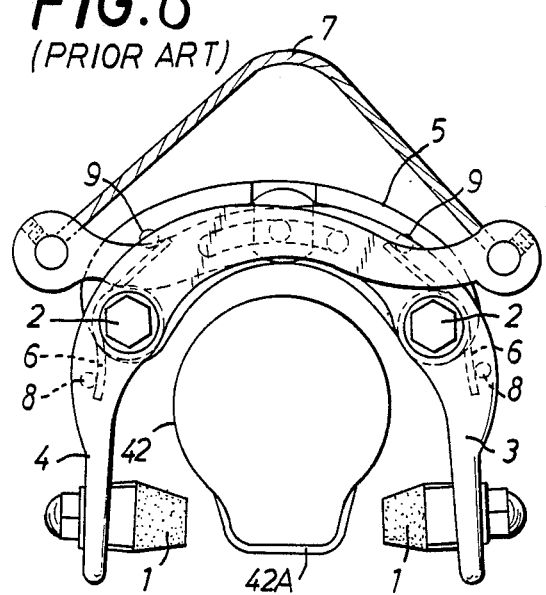
FIG.6
(PRIOR ART)

CENTER-PULL CALIPER BRAKE

FIELD OF THE INVENTION AND RELATED ART STATEMENT

The present invention relates to a center-pull caliper brake for bicycles, and more particularly to an improved structure for retaining the return spring of the brake.

FIG. 6 shows a conventional center-pull caliper brake generally known. The brake comprises a pair of brake arms 3, 4 each having an intermediate portion supported by a pivot 2 and movable about the pivots toward or away from each other, each of the brake arms being provided at its lower end with a brake shoe 1 for braking a wheel 42 by contact with its rim 42A, an arm bracket 5 attached to the body of the bicycle and supporting the brake arms 3, 4 thereon, a pair of return springs 6 provided for the pair of brake arms 3, 4 respectively for always biasing the brake arms away from each other to move the brake shoes 1 away from each other, and a suspension wire 7 interconnecting the upper ends of the brake arms 3, 4. Each of the return springs 6 is wound around the pivot 2 and has one end engaged with a rear projection 8 on the brake arm and the other end in engagement with a front projection 9 on the arm bracket 5.

The return spring 5 of the conventional brake is left exposed as wound around the pivot 2, therefore deteriorates due to the deposition of mud, corrosion or the like and is not usable for a prolonged period of time, while it appears unsightly. Further when the brake is operated, the opposite ends of the return spring 6 slide relative to the rear and front projections 8, 9 with great friction, rendering the brake difficult to operate smoothly and possibly causing damage to the projections 8, 9 early.

Moreover, the force of the return spring is not adjustable.

OBJECTS AND SUMMARY OF THE INVENTION

The present invention has been accomplished to overcome the problems of the prior art.

More specifically, a first object of the present invention is to provide a brake wherein each of a pair of brake arms is formed in its boss portion with a cavity around a pivot, and a return spring has a coil portion fitted around the pivot and accommodated in the cavity, so that the return spring is rendered free of deposition of mud, corrosion or the like to make the brake operable reliably.

A second object of the present invention is to provide a brake of the type described wherein the spring having its coil portion accommodated in the cavity has one end engaged with the boss portion immovably relative thereto and the other end engaged with an adjusting member immovably relative thereto which member is supported by the pivot, the return spring thus being mounted in place without using any engaging pin that could break, with its opposite ends fixedly positioned and precluded from sliding movement which would entail friction, so that the spring is made operable smoothly without giving off any frictional noise.

A third object of the present invention is to provide a brake of the type described wherein the adjusting member having the return spring end fixed thereto is rotatable from the front about the pivot to reduce the diameter of the spring coil portion and thereby adjust the force of the spring.

Other objects of the invention will become more apparent from the following description with reference to the accompanying drawings.

The present invention provides a center-pull caliper brake comprising a pair of brake arms movable toward or away from each other and each having a brake shoe, an arm bracket attachable to the body of a bicycle and supporting the brake arms thereon, and a pair of return springs provided for the pair of brake arms respectively for biasing the brake arms away from each other to move the brake shoes away from each other. To fulfill the foregoing objects, the brake has the following technical means.

Each of the brake arms has a boss portion formed with a cavity around a pivot on the arm bracket, and the return spring has a coil portion provided around the pivot and accommodated in the cavity. The spring has at its one end an engaging portion engaged with the boss portion immovably relative thereto. An adjusting member is supported by the pivot and is rotatable only in the coil portion winding direction. The spring has at the other end thereof an engaging portion in engagement with the adjusting member immovably relative thereto.

BRIEF DESCRIPTION OF THE DRAWINGS

FIGS. 1 to 5 show an embodiment of the present invention;

FIG. 1 is an overall front view;

FIG. 2 is a fragmentary view in section;

FIG. 3 is a view in section taken along the line III—III in FIG. 2;

FIG. 4 is a plan view in section and partly in development of FIG. 3;

FIG. 5 is an exploded perspective view showing the embodiment as it is seen from the front; and FIG. 6 is a front view showing a conventional brake.

DESCRIPTION OF THE PREFERRED EMBODIMENT

An embodiment of the invention will be described below in detail with reference to the drawings.

Figure 1:
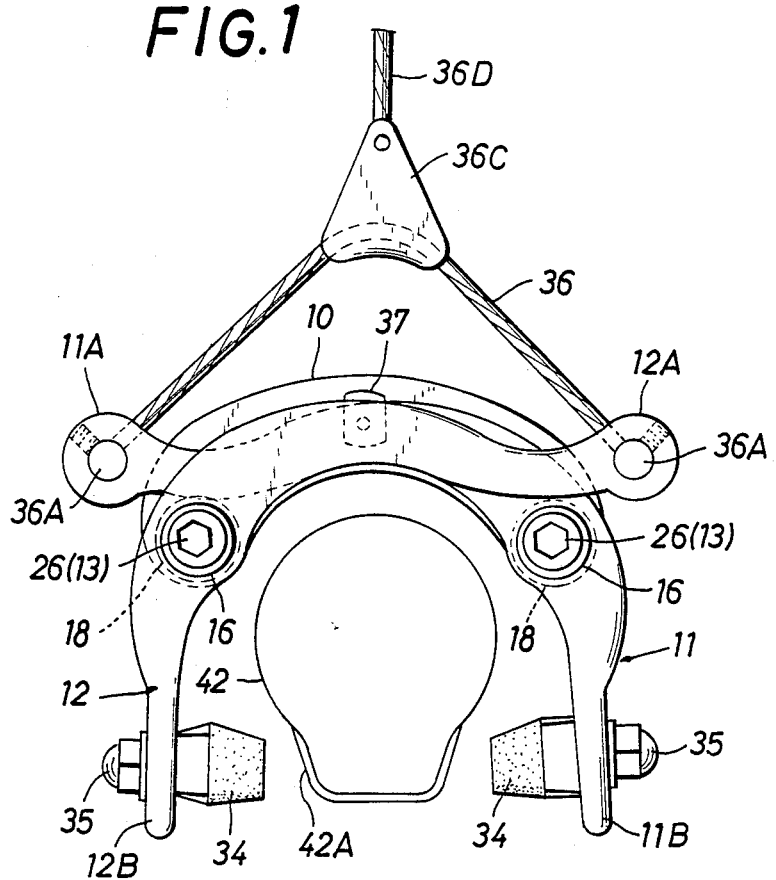

FIG. 1 shows a center-pull caliper brake in its entirety. The brake comprises an arm bracket 10 fastened to the body of a bicycle with a bolt 37, etc., and a pair of brake arms 11, 12 each having a boss portion 16 movably supported by a pivot 13, etc. on one end of the bracket 10. Each of the brake arms 11, 12 has one end formed with a wire attaching portion 11A (12A) with a hole and the other end formed with a shoe mount portion 11B (12B) with a hole. A suspension wire 36 has end members 36A fitted in the respective attaching portions 11A, 12A. A brake shoe 34 movable into or out of contact with the rim 42A of a wheel 42 is attached to each mount portion 11B (12B) with a bolt 34A, washer 35A and nut 35.

The suspension wire 36 is connected to a pulling wire 36D by a hanger 36C. The pulling wire 36D, when pulled by an unillustrated brake operating lever, moves the brake arms 11, 12 about the respective pivots 13 against the force of return springs 18 wound around the pivots 13 to brake the wheel 34 with the brake shoes 34.

Figure 2:
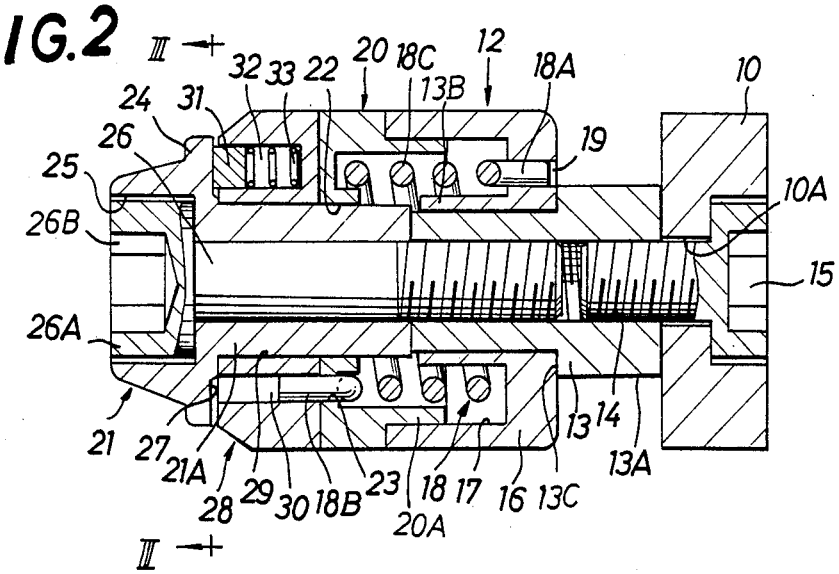

FIG. 2 shows the right brake arm 12 in section along the axis of the pivot 13. The left brake arm has the same construction as the right one except that the two arms are opposite to each other in the winding direction of the coil portion 18C of the return spring 18 as seen in the exploded perspective view of FIG. 5.

Figure 5:
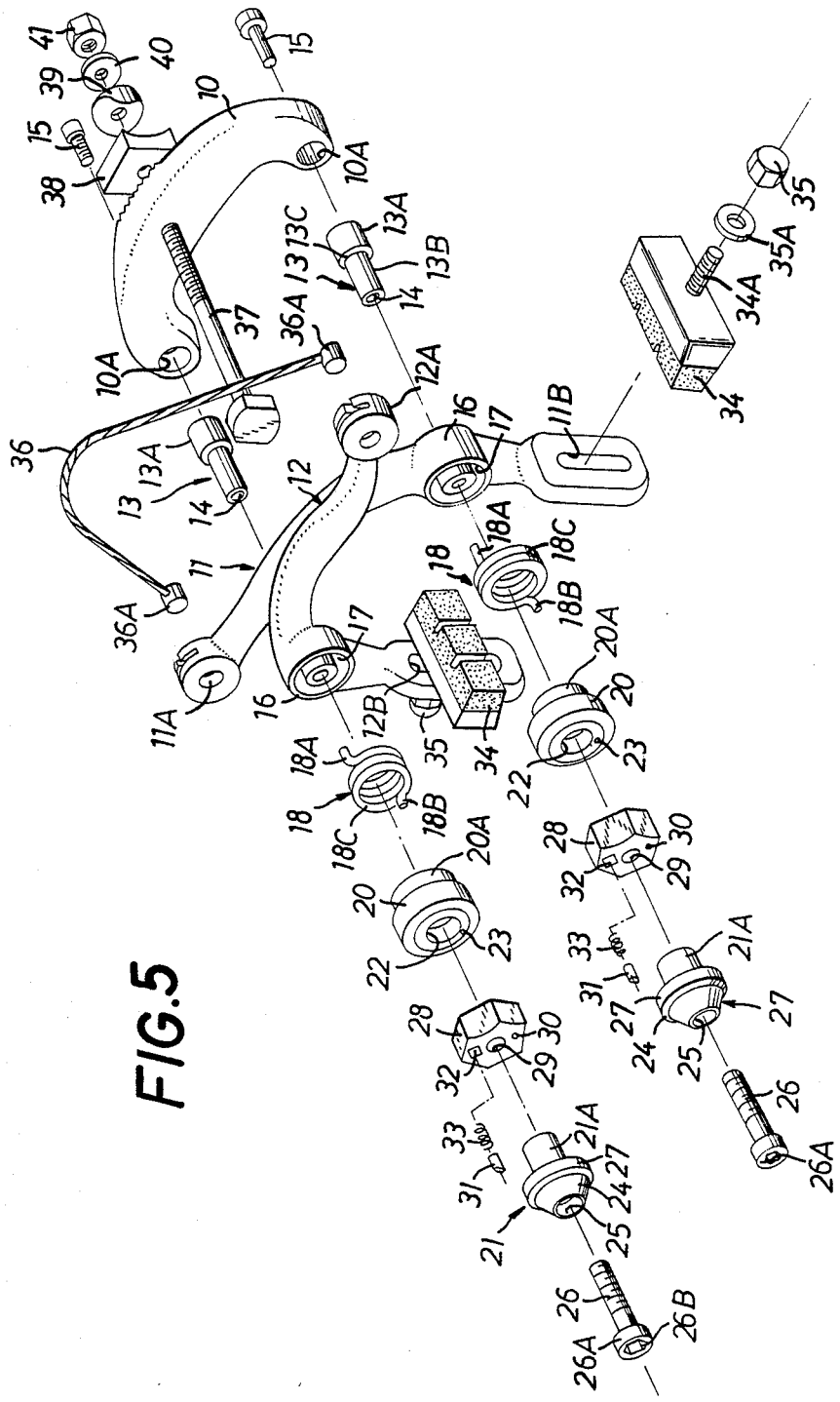

With reference to FIG. 5, a pair of clamp members 38, 39 are arranged in the rear of the arm bracket 10 for holding, for example, the front fork (not shown), and the fastening bolt 37 is inserted through the bracket 10 and these members to fasten the bracket 10 to the folk using a washer 40 and nut 41. A mount hole 10A is formed in each end of the bracket 10.

The pivot 13 is a hollow rod having a stepped portion and a base 13A and is attached to the end of the bracket 10 by inserting the base 13A into the mount hole 10A or placing the base in contact with the front side of the bracket 10, and screwing a bolt 15 in the pivot 13 which is internally threaded as indicated at 14. Insofar as the pivot 13 has the internally threaded portion 14, the pivot 13 may be formed integrally with the bracket 10.

Each of the brake arms 11, 12 has an intermediate boss portion 16, which is fitted around the shank 13B of the pivot 13 and positioned as specified axially thereof by the stepped portion 13C. The brake arm is rotatable about the axis of the pivot 13.

The boss portion 16 has a cavity 17 provided around the pivot 13 and opened only at its front side. The return spring 18 is accommodated in the cavity 17.

The return spring 18 has the coiled portion 18C and straight engaging portions 18A, 18B projecting from opposite ends of the portion 18C axially outward. The right and left coil portions 18C are opposite in the direction of winding. As will be apparent from FIG. 5, the right one is wound clockwise, and the left one counterclockwise.

The engaging portion 18A of the spring fitted around the pivot 13 and accommodated in the cavity 17 is inserted in a hole 19 formed in the rear wall (bottom wall) of the cavity 17 and engaged with the wall immovably relative thereto even if the coil portion 18C is twisted in the winding direction.

A spring cap 20 has a tubular portion 20A inserted in the opening of the cavity 17. The cap 20 is centrally formed with an axial bore 22. A hole 23 for inserting the spring engaging portion 18B therethrough is formed in the front wall of the cap 20.

A ratchet sleeve 21 has a tubular portion 21A inserted through the bore 22 of the cap 20. A fastening bolt 26 is inserted through the tubular portion 21A and screwed in the threaded portion 14 of the pivot 13 from the front, thereby pressing the inserted end of the tubular portion 21A against the end of the pivot 13 opposed thereto.

The ratchet sleeve 21 has a flange 24 at its outer end. The flange 24 is formed with a recessed portion 25 for accommodating therein the head 26A of the bolt 26 having a tool socket 26B. Ratchets teeth 27 in a radial arrangement are formed on the rear side of the flange 24 as seen in FIG. 3.

An adjusting member 28 is provided between the rear side of the flange 24 of the ratchet sleeve 21 and the front wall of the cap 20. The adjusting member 28 has an outer peripheral portion resembling a hexagonal nut in contour and engageable with a rotating tool such as a wrench. The member 28 is centrally formed with a sleeve bore 29 and has a hole 30 positioned in corresponding relation to the hole 23 of the cap 20. The engaging portion 18B of the return spring 18 is engaged in the hole 30 immovably relative to the member 28. The adjusting member 28 substantially closes the front opening of the cavity 17 with the cap 20 interposed therebtween. A cavity 32 for a pawl 31 to fit in is formed in the front side of the adjusting member 28 which is opposed to the ratchet teeth 27. A coiled spring 33 for pressing the pawl 31 is accommodated in the cavity 32. The ratchet teeth 27, pawl 31, etc. provide ratchet means. The pawl 31 is pressed against the toothed portion 27 by the spring 33 under a predetermined pressure at all times. As seen in FIG. 4, the adjusting member 28 is permitted to rotate only in a specified direction A, i.e. the winding direction of the coil portion 18C of the return spring 18, but is prevented from rotation in the other direction B.

When the brake is operated, the pair of brake arms 11, 12 rotate about the respective pivots 13 to bring the opposed brake shoes 34 into pressing contact with opposite sides of the rim 42A of the wheel 42 to exert a braking force. The front-end engaging portion 12B of each return spring 18 is fixed to the arm bracket 10 through the adjusting member 28, pawl 31, toothed ratchet portion 27, ratchet sleeve 21, fastening bolt 26 and pivot 13, so that each brake arm 11 (12) causes the rear-end engaging portion 18A to wind or tighten up the coil portion 18C. When the brake is released from the operating force, the return springs 18 act to rotate the brake arms 11, 12 in the reverse direction, moving the arm lower ends away from each other and returning the brake shoes to their initial position.

The tension of the coil portion 18C of the return spring 18 is adjustable by rotating the adjusting member 28 as by a wrench in the direction of arrow A in FIG. 4 and thereby tensioning the coil portion 18C of the spring 18. The increased tension of the spring acts on the brake arm 11 (12), with the result that a greater spring force acts when the brake arm 11 is moved away from the other arm 12 (11). Furthermore, the tension of the pair of brake arms 11, 12 is adjustable in balance. When the adjusting member 28 is rotated, the pawl 31 moves on the toothed ratchet face 27, intermittently producing clicks. The number of clicks indicates the amount of winding or tensioning the return spring 18, i.e. the amount of adjustment. Accordingly, the pair of brake arms 11, 12 are adjustable in balance properly with ease.

The pivot 13 of the foregoing embodiment can be made to extend forward so as to be integral with the tubular portion 21A of the ratchet sleeve 21 to fit the adjusting member 28 directly around the pivot 13 and render the member 28 rotatable thereon.

Furthermore, the spring cap 20 can be integral with the adjusting member 28 to reduce the number of components.

When grease is filled in the spring accommodating cavities of the brake arms 11, 12 and the spring caps 20, the parts concerned can be protected from corrosion effectively.

With the center-pull caliper brake of the invention described above, the boss portion 16 of each brake arm 11 (12) is formed with a cavity 17 around the pivot 13, and the coil portion 18C of a return spring 18 is fitted around the pivot 13 and accommodated in the cavity 17. Accordingly, the return spring is not left exposed unlike the conventional one, is free of the deposition of mud or corrosion and therefore functions fully as contemplated. The pair of brake arms can accordingly be maintained in good balance.

The return spring 18 has at its one end an engaging portion 18A engaged with the boss portion 16 of the brake arm immovably relative thereto, and at the other end thereof an engaging portion 18B immovably engaged with an adjusting member 28 which is supported by the pivot 13 movably only in the spring winding direction but prevented from rotating in the opposite direction. Thus, the engaging end portions 18A, 18B of each return spring 18 are fixedly positioned and precluded from sliding movement, so that the spring is operable smoothly without frictional resistance, does not give off any disagreeable frictional noise and does not permit the brake to act on only one side of the wheel due to a difference in frictional resistance between the pair of springs. Moreover, the spring tension is adjustable by the adjusting member 28. The present brake is sightly in appearance and therefore has an increased commercial value.

What is claimed is:

1. A center-pull caliper brake including a pair of brake arms movable toward or away from each other, each brake arm having a brake shoe, an arm bracket attachable to the body of a bicycle and supporting the brake arms thereon, the arm bracket having a pivot, and a pair of coiled return springs provided for the pair of brake arms for biasing the brake arms away from each other to move the brake shoes away from each other, the brake being characterized by:

a boss portion formed on each brake arm with a cavity around the pivot;

a fastening bolt for each brake arm tightly attached to the pivot from the front, and passing through a respective boss portion;

a ratchet sleeve fixedly fitted around the fastening bolt; and the return spring having an adjusting member and a coil portion provided around the pivot and accommodated in the cavity and having first and second ends, the first end having an engaging portion engaged with the boss portion and immovable relative thereto, the second end having an engaging portion engaged with the adjusting member, and the adjusting member being supported by the pivot, substantially closing the front opening of the cavity, and being rotatable only in the coil portion winding direction, the adjusting member being fitted around the sleeve rotatably about its axis, the adjusting member and the ratchet sleeve being provided on their opposed portions with ratchet means for permitting the adjusting member to rotate in the coil portion winding direction but preventing the rotation thereof in the other direction.

2. A brake as defined in claim 1 wherein the ratchet means comprises a pawl and a ratchet portion, the pawl being provided on the adjusting member, the ratchet sleeve having a flange formed with the ratchet portion, a spring being accommodated in a cavity in the adjusting member for pressing the pawl into engagement with the ratchet portion.

3. A brake as defined in claim 1 wherein the fastening bolt has a head having a tool engaging portion, and a recessed portion having the head accommodated therein is formed in a flange of the ratchet sleeve.

* * * * *